(12) United States Patent
Yamada et al.

(10) Patent No.: US 8,002,353 B2
(45) Date of Patent: Aug. 23, 2011

(54) VEHICLE SEAT RECLINING APPARATUS

(75) Inventors: Yukifumi Yamada, Toyota (JP); Naoki Goto, Tokai (JP); Shinya Isobe, Nagoya (JP); Kazuhide Ishikawa, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/922,778

(22) PCT Filed: Jul. 2, 2009

(86) PCT No.: PCT/JP2009/062091
§ 371 (c)(1),
(2), (4) Date: Sep. 15, 2010

(87) PCT Pub. No.: WO2010/007894
PCT Pub. Date: Jan. 21, 2010

(65) Prior Publication Data
US 2011/0018325 A1 Jan. 27, 2011

(30) Foreign Application Priority Data

Jul. 15, 2008 (JP) .................................. 2008-183585
Mar. 26, 2009 (JP) .................................. 2009-076133

(51) Int. Cl.
*B60N 2/48* (2006.01)
(52) U.S. Cl. .................. 297/366; 297/367 L; 297/367 R
(58) Field of Classification Search .............. 297/367 R, 297/367 L, 366
See application file for complete search history.

(56) References Cited

U.S. PATENT DOCUMENTS

| | | | | |
|---|---|---|---|---|
| 6,039,400 A * | 3/2000 | Yoshida et al. | ........... | 297/367 R |
| 6,474,740 B1 * | 11/2002 | Kondo et al. | .............. | 297/367 R |
| 6,669,296 B2 * | 12/2003 | Moriyama et al. | ........ | 297/367 R |
| 6,715,835 B2 * | 4/2004 | Hoshihara et al. | ............ | 297/366 |
| 7,097,251 B2 * | 8/2006 | Uramichi | ....................... | 297/366 |
| 7,195,318 B2 * | 3/2007 | Cha et al. | ................... | 297/367 R |
| 7,261,379 B2 * | 8/2007 | Volker et al. | .............. | 297/367 R |
| 7,874,622 B2 * | 1/2011 | Okazaki et al. | ............ | 297/367 R |
| 2002/0033627 A1 * | 3/2002 | Hoshihara et al. | ............ | 297/367 |

(Continued)

FOREIGN PATENT DOCUMENTS

JP 9 183327 7/1997

(Continued)

*Primary Examiner* — David Dunn
*Assistant Examiner* — Erika Garrett
(74) *Attorney, Agent, or Firm* — Oblon, Spivak, McClelland, Maier & Neustadt, L.L.P.

(57) ABSTRACT

A vehicle seat reclining apparatus is provided which is simple in construction and which is capable of pressing pawls by a cam at places close to meshing portions.

To that end, a plurality of pawls 31 having outer gears 44, 47 which are disengageably engaged with an inner gear 23 provided on an internal surface of an upper arm 12 are constituted by a first pawl 31A having an inner cam portion 45 which is engaged with a cam surface 55 provided on an outer circumference of a cam 32, a pawl grooved cam portion 46 which is engaged with an engaging protrusion 57 provided on a side surface of the cam, and an engaging portion 43 which is brought into engagement with a protruding portion 25 provided on the internal surface of the upper arm when the upper arm is pivotally moved a predetermined angle relative to a lower arm 11 and second pawls 31B having engaging protrusions 49 engaged with release plate grooved cam portions 59 provided in a release plate 33.

5 Claims, 10 Drawing Sheets

U.S. PATENT DOCUMENTS

| | | | |
|---|---|---|---|
| 2002/0096925 A1* | 7/2002 | Uramichi | 297/367 |
| 2003/0230923 A1* | 12/2003 | Uramichi | 297/367 |
| 2007/0057558 A1 | 3/2007 | Kojima | |
| 2007/0132294 A1* | 6/2007 | Yamada et al. | 297/367 |
| 2010/0201175 A1 | 8/2010 | Okazaki et al. | |
| 2010/0219669 A1 | 9/2010 | Yamada et al. | |

FOREIGN PATENT DOCUMENTS

| | | |
|---|---|---|
| JP | 2002 65387 | 3/2002 |
| JP | 2004 105360 | 4/2004 |
| JP | 2007 75424 | 3/2007 |
| JP | 2007 159847 | 6/2007 |

\* cited by examiner

VEHICLE SEAT RECLINING APPARATUS

TECHNOLOGICAL FIELD

The present invention relates to a seat reclining apparatus for vehicle seats which supports a seatback to be angularly adjustable relative to a seat cushion.

BACKGROUND ART

Heretofore, as vehicle seat reclining apparatuses of this kind, there has been known one which is described in Patent Document 1, for example. The apparatus described in Patent Document 1 is provided with a lower arm held on a seat cushion and having a plurality of pawls each with an outer gear at one end and an upper arm rotatably supported by the lower arm with itself secured on a seatback and formed with an inner gear being able to mesh with the outer gears of the pawls. Then, by changing the meshing positions of the inner gear with the outer gears, it is possible to adjust the inclination angle of the seatback.

In the seat reclining apparatus described in Patent Document 1, in order to simultaneously move the plurality of pawls radially of a rotation shaft for the lower arm and the upper arm, there is provided a locking mechanism having a cam which is arranged rotatably relative to the lower arm. In the seat reclining apparatus like this, in order to make a passenger easy in getting on and off with respect to a rear seat by rotating the seatback forward relative to the seat cushion, there is provided a so-called "forward folding mechanism" which is capable of bringing the outer gears of the pawls out of meshing with the inner gear of the upper arm in an angular range beyond a predetermined angle so that the seatback can be rotated through a large angle. This mechanism is constructed so that the respective pawls are provided with protrusions while the upper arm is formed with respective contact portions at positions facing the protrusions of the respective pawls in a forward folding angular range, to obstruct meshing engagements between the outer gears of the pawls and the inner gear of the upper arm.

PRIOR ART DOCUMENT

Patent Document

Patent Document 1: JP9-183327 A

SUMMARY OF THE INVENTION

Problem to Be Solved By the Invention

In the apparatus described in Patent Document 1, because the construction is such that a first peg (12) for holding each pawl at an unlocked position and a second peg (13) for releasing the locking of each pawl are provided on each pawl with a space in the radial direction of the arm, the distance between portions of the pawls pressed by a cam and the meshing portions between the inner gear and the outer gears becomes long, and this gives rise to a problem that steadiness in maintaining the strength is detracted. Further, if an attempt is made to arrange the pressed portions outside, a problem would arise in that the arms become large in diameter, resulting in a disadvantage in respect of space.

The present invention has been made for solving the foregoing problems, and an object thereof is to provide a vehicle seat reclining apparatus capable of pressing pawls by a cam at positions close to meshing portions.

Measures for Solving the Problem

In order to solve the aforementioned problems, the feature of the invention in a first aspect resides in comprising a lower arm adapted to be supported on a seat cushion; an upper arm supported by the lower arm to be relatively pivotally movable and adapted to be supported on a seatback; a plurality of pawls arranged in the lower arm to be radially movable along guide walls and having outer gears disengageably engaged with an inner gear provided on an internal surface of the upper arm; a cam for radially moving the pawls by being rotated, a release plate attached bodily to the cam; and an urging member for urging the cam to rotate in one direction; wherein the pawls comprise a first pawl having an inner cam portion engaged with a cam surface provided on an outer circumference of the cam, a pawl grooved cam portion engaged with an engaging protrusion provided on a side surface of the cam, and an engaging portion brought into engagement with a protruding portion provided on an internal surface of the upper arm when the upper arm is pivotally moved a predetermined angle relative to the lower arm; and a second pawl having an inner cam portion engaged with the cam surface provided on the outer circumference of the cam and an engaging protrusion engaged with a release plate grooved cam portion provided in the release plate.

The feature of the invention in a second aspect resides in that in the first aspect, the pawls comprise the first pawl being one in number and the second pawls being plural in number.

The feature of the invention in a third aspect resides in that in the second aspect, the release plate takes an approximately ring shape as a whole with a sector cutout provided at a part thereof and that the first pawl is arranged at the place of the cutout to avoid an interference between the first pawl and the release plate.

The feature of the invention in a fourth aspect resides in that in the first aspect, three pressed portions on which the cam surface of the cam acts are provided at a center portion and both sides of the inner cam portion provided on each pawl and that each of the pressed portions provided at the center portion and on a side ahead in a locking rotation direction of the cam of each pawl is constituted by a cam surface having an inclined surface which comes close to the cam surface of the cam with rotation of the cam in the locking rotation direction, while the pressed portion provided on a side behind in the locking rotation direction of the cam is constituted by an arc surface having its center on a rotation center of the cam.

The feature of the invention in a fifth aspect resides in that in the first aspect, the first pawl is formed with a thickened portion which is increased in thickness to protrude beyond an end surface of the release plate, that a first recessed portion for receiving the release plate and a second recessed portion which is deeper in depth than the first recessed portion for receiving the thickened portion of the first pawl are formed in the upper arm over a predetermined angular range, and that step portions at two places for limiting the range of a reclining operation to a predetermined range in contact with the thickened portion of the first pawl are provided at a boundary portion between the first recessed portion and the second recessed portion.

BRIEF DESCRIPTION OF THE DRAWINGS

[FIGS. 4(A)-4(B)] are detailed views showing a first pawl, wherein FIG. 4(A) is a front view of the first pawl and FIG. 4(B) is a side view as viewed from the B-direction.

[FIGS. 5(A)-5(B)] are detailed views of a second pawl, wherein FIG. 5(A) is a front view of the second pawl and FIG. 5(B) is a side view as viewed from the B-direction.

FORMS FOR PRACTICING THE INVENTION

Figure 1:
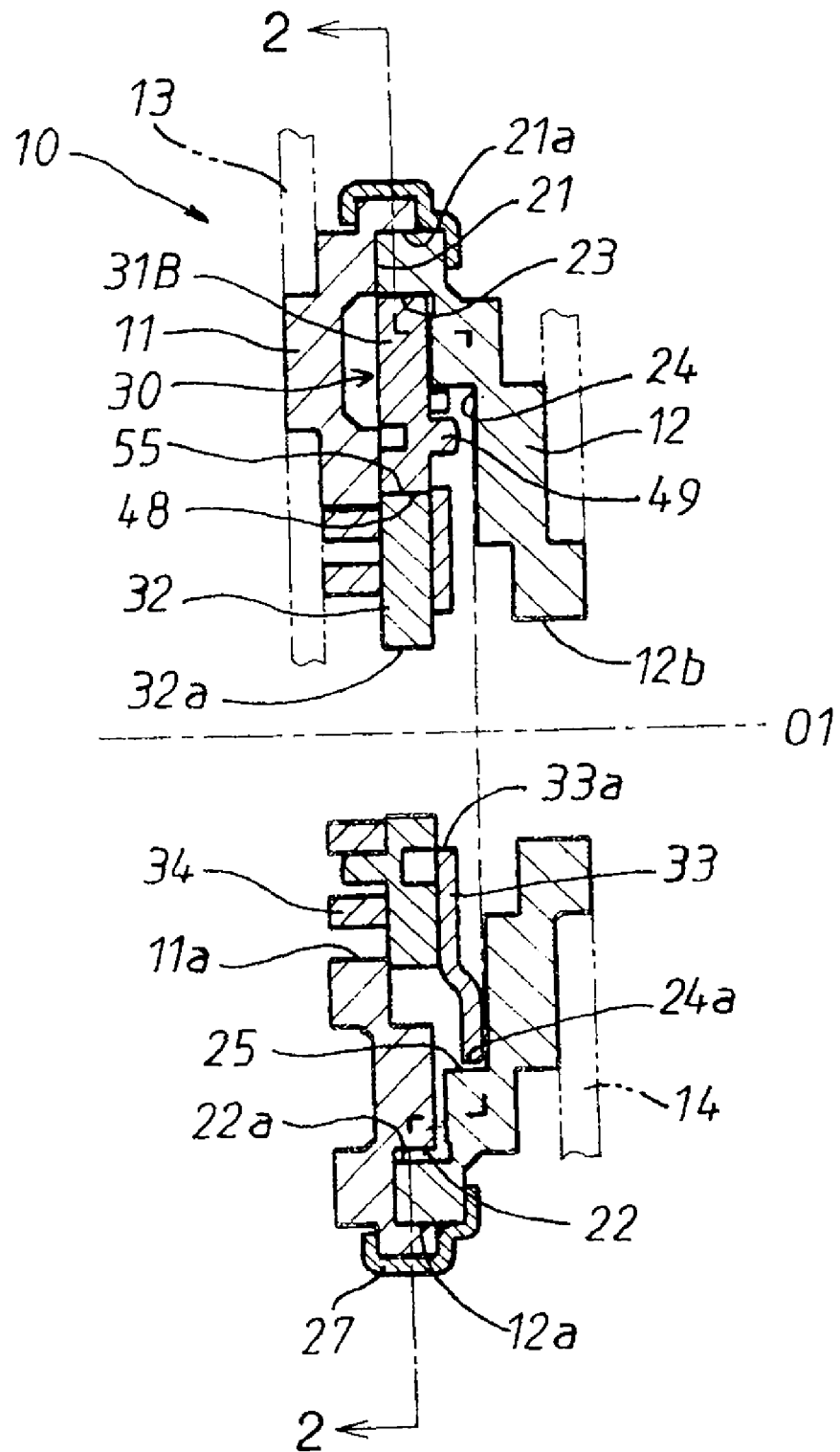
[FIG. 1] is a longitudinal sectional view, taken along the line 1-1 in FIG. 2, of a seat reclining apparatus showing a first embodiment according to the present invention.

Hereafter, a first embodiment of the present invention will be described with reference to the drawings. As shown in FIG. 1, a vehicle seat reclining apparatus 10 is provided with a lower arm 11 and an upper arm 12 which are disc-like. The lower arm 11 is secure to a seat cushion frame 13, while the upper arm 12 is secured to a seatback frame 14.

The lower arm 11 is provided with a round recessed portion 21 formed by half blanking to open toward the upper arm 12. The round recessed portion 21 of the lower arm 11 has an internal surface 21a placing its center on a rotation axis O1 of the upper arm 12 and the lower arm 11. The upper arm 12 is fitted so that its outer surface 12a is in slidable contact with the internal surface 21 a of the lower arm 11.

Figure 2:
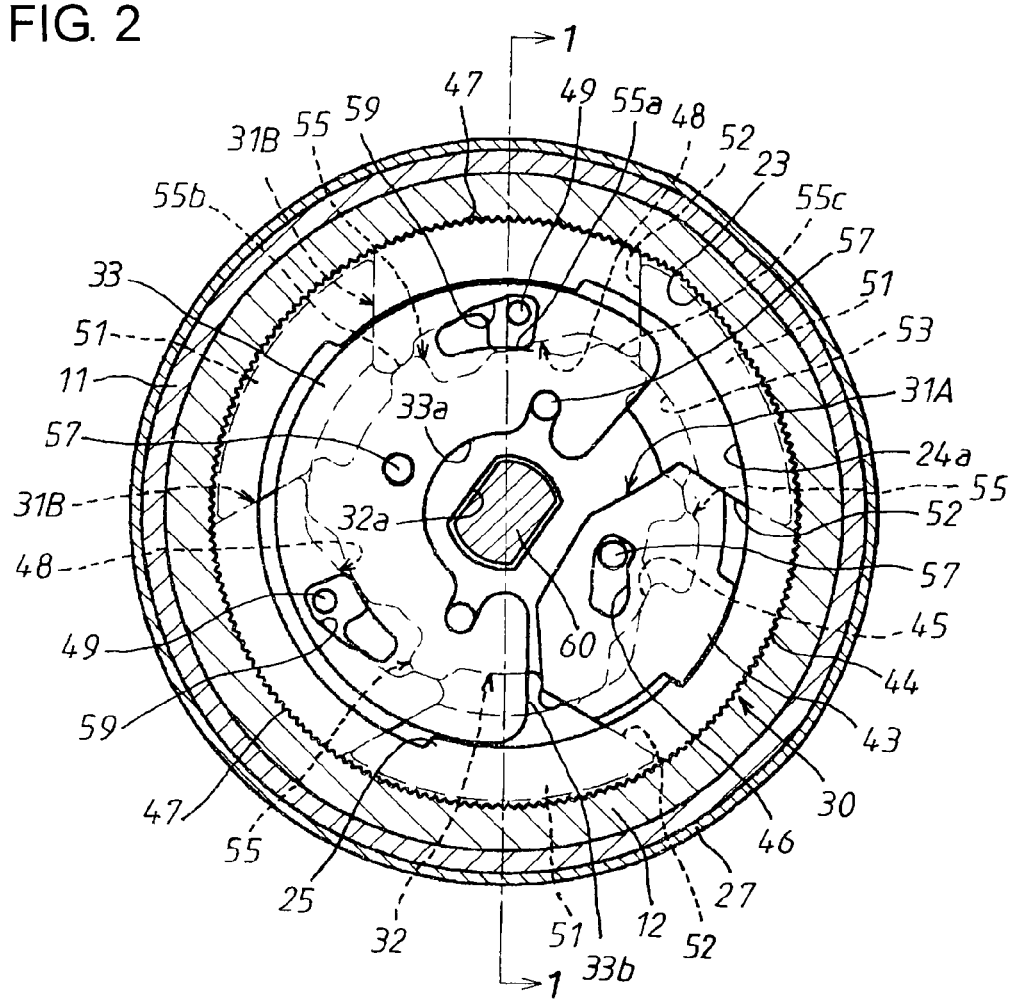
[FIG. 2] is a sectional view taken along the line 2-2 in FIG. 1.

On the other hand, the upper arm 12 is provided with a round recessed portion 22 formed by half blanking to open toward the lower arm 11 and has a through hole 12b at its center portion. The round recessed portion 22 of the upper arm 12 has an internal surface 22a placing its center on the rotation axis O1. The internal surface 22a of the round recessed portion 22 is formed with an inner gear 23 over the entire circumference. On the inner side of the recessed portion 22, a round recessed portion 24 is formed by half blanking on a circle concentric with the round recessed portion 22. On an internal surface 24a of the round recessed portion 24, protrusions 25 are formed at two places in the circumference to extend toward the rotation axis O1, as shown in FIG. 2.

A ring-like holder 27 made of a metal plate is fitted on the outer circumferential portions of the lower arm 11 and the upper arm 12, with the internal surface 21a of the round recessed portion 21 of the lower arm 11 fitted on the outer surface 12a of the upper arm 12, and the lower arm 11 and the upper arm 12 are allowed to rotate relatively but are prevented from coming off in the axial direction.

Figure 3:
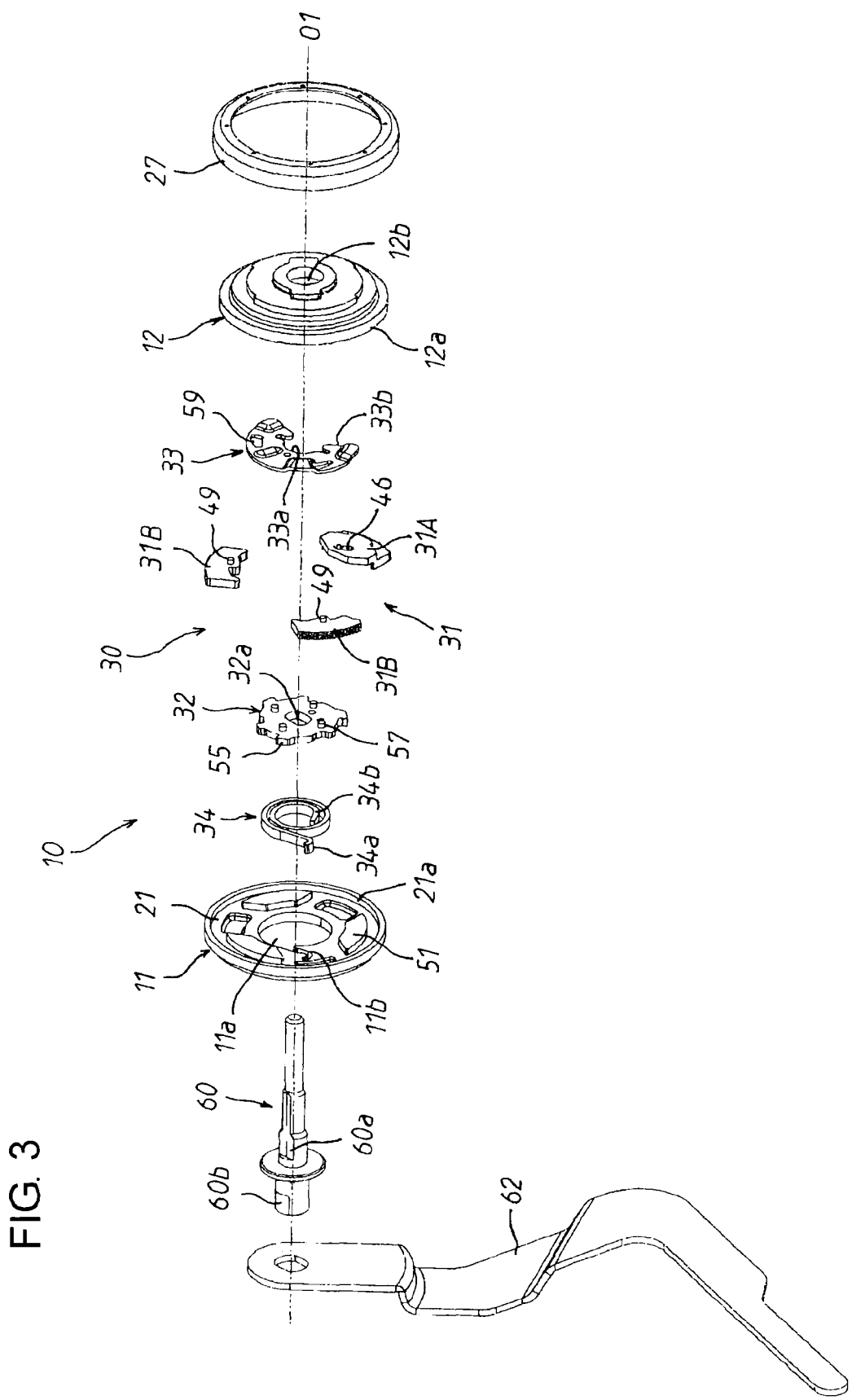
[FIG. 3] is an exploded view of the seat reclining apparatus shown in FIG. 1.

A locking mechanism 30 is arranged between the lower arm 11 and the upper arm 12. As shown in FIGS. 2 and 3, the locking mechanism 30 is composed mainly of three pawls 31 (31A and 31B referred to later) on a circle, a cam 32, a release plate 33 and a spiral spring 34 as urging member (refer to FIG. 3). The pawls 31 comprise three pawls of two kinds which are arranged at equiangular intervals on a surface orthogonal to the rotation axis O1.

Figure 4A:
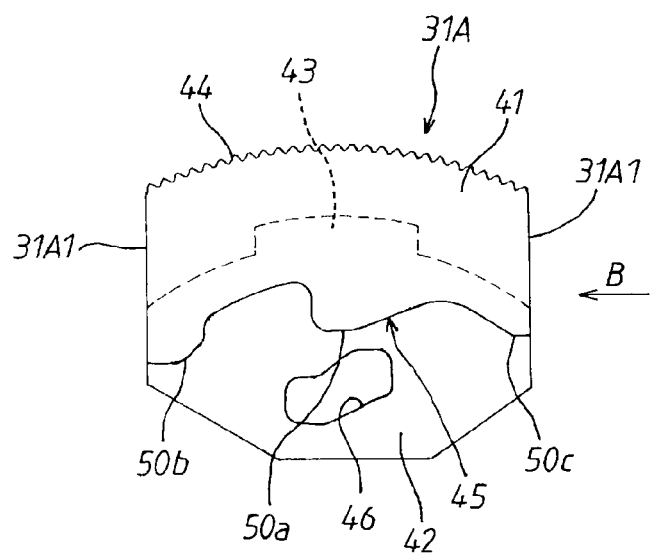
Figure 4B:
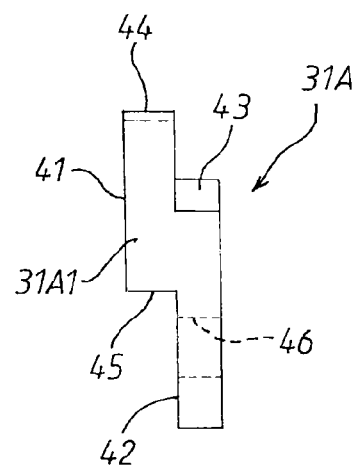

One pawl 31 (hereafter referred to as first pawl 31A) is manufactured by, for example, forging a steel, and as shown in FIGS. 4(A) and 4(B) in detail, is provided with a first block 41 and a second block 42 which are formed to be offset from each other as viewed in a side view. As shown in FIG. 2, the first pawl 31A is arranged to locate the first block 41 on the internal surface 22a side of the upper arm 12 and the second block 42 on the axis side of the upper arm 12. The opposite width-end portions 31A1 of these first block 41 and second block 42 are formed to be in alignment and to represent parallel straight lines. The outward end (the end surface facing the inner gear 23 of the upper arm 12) of the first block 41 is formed with an outer gear 44 being able to mesh with the inner gear 23 of the upper arm 12, while the inward end (the end surface opposite to the outward end) of the first block 41 is formed with an inner cam portion 45 engageable with an outer surface of the cam 32. Further, in the second block 42, a pawl grooved cam portion 46 is provided to pass through in the thickness direction at about the center portion in the width direction.

Figure 5A:
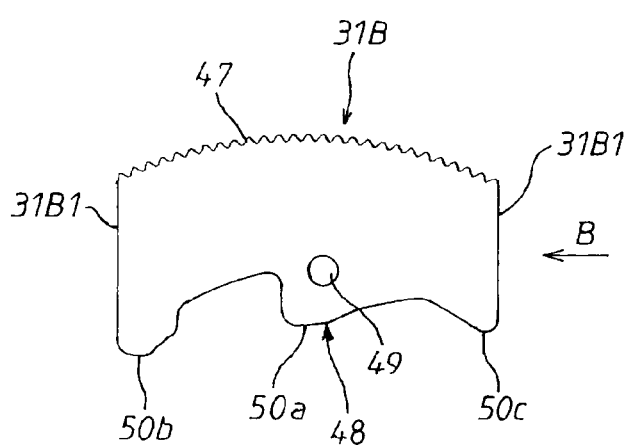
Figure 5B:
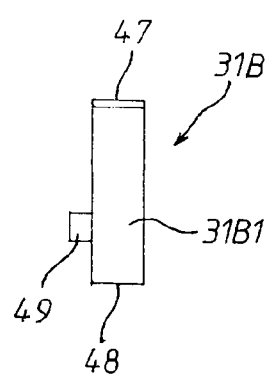

On the other hand, of the three, two remaining pawls 31 (hereafter referred to as second pawls 31B) are manufactured by, for example, pressing a plate-like steel sheet, and as shown in FIGS. 5(A) and 5(B) in detail, each takes a flat shape which closely resembles the shape configured only by the first block 41 of the first pawl 31A by cutting out the second block 42 therefrom, and hence, which does not have any step. That is, the second pawl 31B is formed to be radially shorter by the length of the second block 42 than the first pawl 31A and to be thinner by the thickness of the second block 42. Like the first pawl 31A, the second pawl 31B has the opposite width-end portions 31B1 formed to represent parallel straight lines. The outward end of each second pawl 31B is formed with an outer gear 47 being able to mesh with the inner gear 23 of the upper arm 12. The inward end of each second pawl 31B is formed with an inner cam portion 48 engaged with the outer surface of the cam 32. Further, an engaging protrusion 49 is provided on an end surface of the second pawl 31B to protrude from a center portion in the width direction.

The inner cam portion 45 formed at a stepped portion of the aforementioned first pawl 31A and the inner cam portion 48 formed at the inward end of the second pawl 31B are formed to take the same shape. Specifically, as shown in FIGS. 4(A) and 5(A), each of the inner cam portions 45, 48 is provided with three pressed portions 50a, 50b, 50c on which cam surfaces 55 of the cam 32 act, at a center portion and opposite sides in the circumferential direction of each of the first and second pawls 31A, 31B. The pressed portion 50a and the pressed portion 50b, which are provided at the center portion and on a side ahead in a locking rotation direction of the cam 32, of each of the first and second pawls 31A, 31B are constituted by cam surfaces each having an inclined surface which comes close to the cam surfaces 55 of the cam 32 with rotation of the cam 32 in the locking rotation direction (counterclockwise in FIG. 2), whereas the pressed portion 50c which is provided on a side behind in the locking rotation direction of the cam 32 is constituted by an arc surface having its center on the rotation center of the cam 32.

In the round recessed portion 21 of the lower arm 11, three guide walls 51 are arranged at equiangular intervals, and guide surfaces 52 which slidably guide the opposite width-end portions 31A1, 31B1 (refer to FIGS. 4 and 5) of each of the first and second pawls 31A, 31B each between two adjoining guide walls 51 are formed in parallel to face each other. Thus, the first and second pawls 31A, 31B are slidably moved in the radial direction of the lower arm 11 and the upper arm 12 by being guided along the guide surfaces 52 of the guide walls 51 and enable the respective outer gears 44, 47 to be disengageably engaged with the inner gear 23. The guide walls 51 are formed at internal surfaces thereof with arc surfaces 53 having a center on the rotation axis O1.

The cam 32 of the locking mechanism 30 is arranged in the round recessed portion 22 of the upper arm 12 to be rotatable about the rotation axis O1 and has a through hole 32a at its center portion. Further, the cam 32 has three cam surfaces 55 on its outer circumference at equiangular intervals. Of these, one cam surface 55 is arranged to be engageable with the respective pressed portions 50a, 50b, 50c of the inner cam portion 45 of the first pawl 31A, while the two remaining cam surfaces 55 are arranged to be engageable with the respective pressed portions 50a, 50b, 50c of the respective inner cam portions 48 of the second pawls 31B. The cam surfaces 55 are able to press the first and second pawls 31A, 31B at portions of the same which are close to meshing portions between the respective outer gears 44, 47 and the inner gear 23, so that it is possible to lock the upper arm 12 against the lower arm 11 reliably with a strong force.

Each cam surface 55 comprises two pressing cam segments 55a, 55b contactable with the pressed portions 50a, 50b of each of the first and second pawls 31A, 31B and one centering segment 55c contactable with the pressed portion 50c. When the cam 32 is rotated in the locking rotation direction, the two pressing cam segments 55a, 55b and said one centering segment 55c are held at such angular positions that they are respectively brought into contact with the respective pressed portions 50a, 50b, 50c of each of the inner cam portions 45, 48 of the first and second pawls 31A, 31B. Further, when the cam 32 is rotated in a direction to release the locking, the pressing cam segments 55a, 55b and the centering segment 55c are moved away from the respective pressed portions 50a, 50b, 50c, and the centering segment 55c is held at such an angular position as to be engaged with the arc surface 53 of the guide wall 51.

A side surface of the cam 32 protrudes a plurality of engaging protrusions 57 at equiangular intervals, and one of these engaging protrusions 57 is engaged with the pawl grooved cam portion 46 formed in the first pawl 31A. The pawl grooved cam portion 46 and the engaging protrusion 57 cooperate to move the first pawl 31A radially inward with rotation of the cam 32 in the locking release rotation direction. The engaging protrusions 57 are not necessarily required to be protruded on the same circle at equiangular intervals, but may be protruded on different circles or with arbitrary intervals secured therebetween.

The release plate 33 made of a thin plate is bodily attached to the side surface of the cam 32, with itself engaged with the engaging protrusions 57, and the release plate 33 has a through hole 33a at its center portion. The release plate 33 is attached to the cam 32 in alignment with the second block 42 of the first pawl 31A at a position in the axial direction and slidably faces end surfaces of the second pawls 31B. This ensures that the second pawls 31B and the release plate 33 can be received in the extent covering the thickness of the first pawl 31A. The release plate 33 comprises an approximately ring shape plate held out of contact with the protrusions 25 formed on the upper arm 12, wherein a sector cutout 33b is formed at a part of the ring shape plate, and the first pawl 31A is arranged at the place of the cutout 33b. That is, by cutting off a sector from the ring-like plate by an angular range corresponding to the first pawl 31A, it is prevented that rotation of the cam 32 brings the release plate 33 into interference with the first pawl 31A.

The release plate 33 is formed on a circle about its rotation center with two release plate grooved cam portions 59 which pass through in the thickness direction. These release plate grooved cam portions 59 are arranged radially outward of the circular position on which the engaging protrusions 57 are arranged, to correspond respectively to the end surfaces of the second pawls 31B. The engaging protrusions 49 protruding from the second pawls 31B are respectively engaged with the release plate grooved cam portions 59. Engagements of the release plate grooved cam portions 59 with the engaging protrusions 49 enable the second pawls 31B to be moved radially inward when the release plate 33, together with the cam 32, is rotated in the locking release direction (clockwise direction in FIG. 2).

As shown in FIG. 3, a hinge shaft 60 is arranged on the rotation axis O1 and rotatably passes through respective through holes 11a, 32a, 33a, 12b which are formed on the rotation center portions of the lower arm 11, the cam 32, the release plate 33 and the upper arm 12. A fitting portion 60a with two flat surfaces formed thereon is formed at about a center portion in the axial direction of the hinge shaft 60. The through hole 32a of the cam 32 with the hinge shaft 60 passing therethrough is formed with two flat surfaces to fit on the fitting portion 60a of the hinge shaft 60, so that hinge shaft 60 and the cam 32 are configured to rotate bodily. Here, as shown in FIG. 2, the through hole 32a of the cam 32 is formed to be slightly larger than the fitting portion 60a of the hinge shaft 60, so that a play in the radial direction is provided between both members. Thus, the cam 32 is slightly movable radially of the hinge shaft 60 within the round recessed portion 22 of the upper arm 12. Further, one end of the hinge shaft 60 is formed with an engaging portion 60b where two flat surfaces are formed, and an operation lever 62 having an engaging hole with two flat surfaces formed thereon to engage with the engaging portion 60b is bodily attached to the hinge shaft 60.

The spiral spring 34 is for urging the cam 32 to rotate in such a direction that the pawls 31 are brought into engagements with the upper arm 12, and is received in the through hole 11a of the lower arm 11. As shown in FIG. 3, the spiral spring 34 is formed by, for example, curving a flat wire rod of an approximately rectangular shape into a predetermined spiral shape and is arranged between the lower arm 11 and the cam 32. That is, an outer end portion 34a of the spiral spring 34 is fixedly engaged with a fixing perforation 11b formed in the lower arm 11, whereas an inner end portion 34b is fixedly engaged with a fixing portion (not shown) provided on an end surface of the cam 32.

By the urging force of the spiral spring 34, the cam 32 is urged to be rotated relative to the lower arm 11 in the locking rotation direction (counterclockwise in FIG. 2), causes its cam surfaces 55 to press the first and second pawls 31A, 31B radially outward, and brings the outer gears 44, 47 of the first and second pawls 31A, 31B into engagements with the inner gear 23 of the upper arm 12.

Next, description will be made regarding the operation of the seat reclining apparatus 10 in the first embodiment constructed as described above.

FIG. 2 shows the seat reclining apparatus 10 in the locked state. In this state, the pressing cam segments 55a, 55b and the centering segments 55c of the cam 32 are respectively in contact with the respective pressed portions 50a, 50b, 50c of the inner cam portions 45, 48 of the first and second pawls 31A 31B, so that the first and second pawls 31A, 31B are being pressed radially outward. Thus, it is possible for the pluralities of pressed portions 50a, 50b, 50c to press the first and second pawls 31A, 31B against the inner gear 23 of the upper arm 12 in a stable posture, and hence, to reliably bring the outer gears 44, 47 of the respective pawls 31 into meshing with the inner gear 23 of the upper arm 12. In this manner, the outer gears 44, 47 of the first and second pawls 31A, 31B are made to mesh with the inner gear 23 of the upper arm 12, and the upper arm 12 is prevented from pivotally moving relative to the lower arm 11. At this time, because of being radially movable relative to the hinge shaft 60 within the round recessed portion 21, the cam 32 is able to press the three pawls 31 (31A, 31B) by approximately equal forces. Accordingly, it is possible to lock the upper arm 12 and hence, the seatback frame 14 reliably without looseness.

Figure 6:
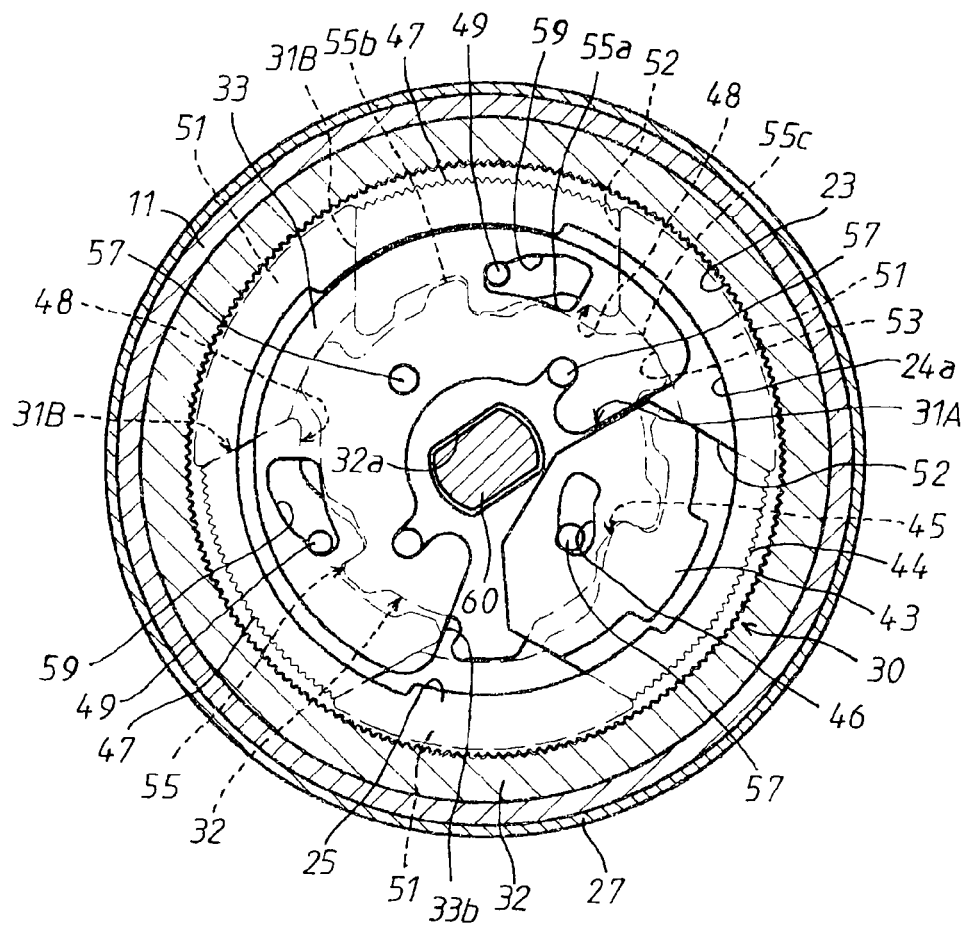
[FIG. 6] is an operational state view of FIG. 2, showing the seat reclining apparatus in a locking released state.

In this state, when the hinge shaft 60 is rotated clockwise in FIG. 2 by the operation of the operation lever 62, the cam 32 and the release plate 33 are bodily rotated against the urging force of the spiral spring 34. As a result, the pressing cam segments 55a, 55b of the cam surfaces 55 are disengaged from the inner cam portions 45, 48 of the first and second pawls 31A, 31B, the centering segments 55c are also displaced in a direction not to interfere with the inner cam portions 45, 48, and the engagement action between the pawl grooved cam portion 46 of the first pawl 31A and the engaging protrusion 57 of the cam 32 causes the first pawl 31A to be withdrawn toward the rotation axis O1 along the guide surfaces 52 of the guide walls 51, whereby as shown in FIG. 6, meshing is released between the outer gear 44 of the first pawl 31A and the inner gear 23. At the same time, the engagement actions between the engaging protrusions 49 of the second pawls 31B and the release plate grooved cam portions 59 cause the second pawls 31B to be withdrawn toward the rotation axis O1 along the guide surfaces 52 of the guide walls 51, whereby meshing is released between the outer gears 47 of the second pawls 31B and the inner gear 23.

As a consequence, it becomes possible to pivotally move the seatback supported by the seatback frame 14 to a desired angular position relative to the seat cushion supported by the seat cushion frame 13. At this time, the centering segments 55c of the cam 32 which are in a set of three are held respectively engaged with the internal surfaces 53 of the guide walls 51, so that the cam 32 is centered by the internal surfaces 53 of the guide walls 51. As a result, the clearances between the outer gears 44, 47 of the first and second pawls 31A, 31B and the inner gear 23 become approximately equal, so that it can be avoided that the malfunction in pivotal movement or the generation of a strange sound occurs as a result that the teeth tops on a part of the pawls 31 interfere with the teeth tops of the inner gear 23.

Figure 7:
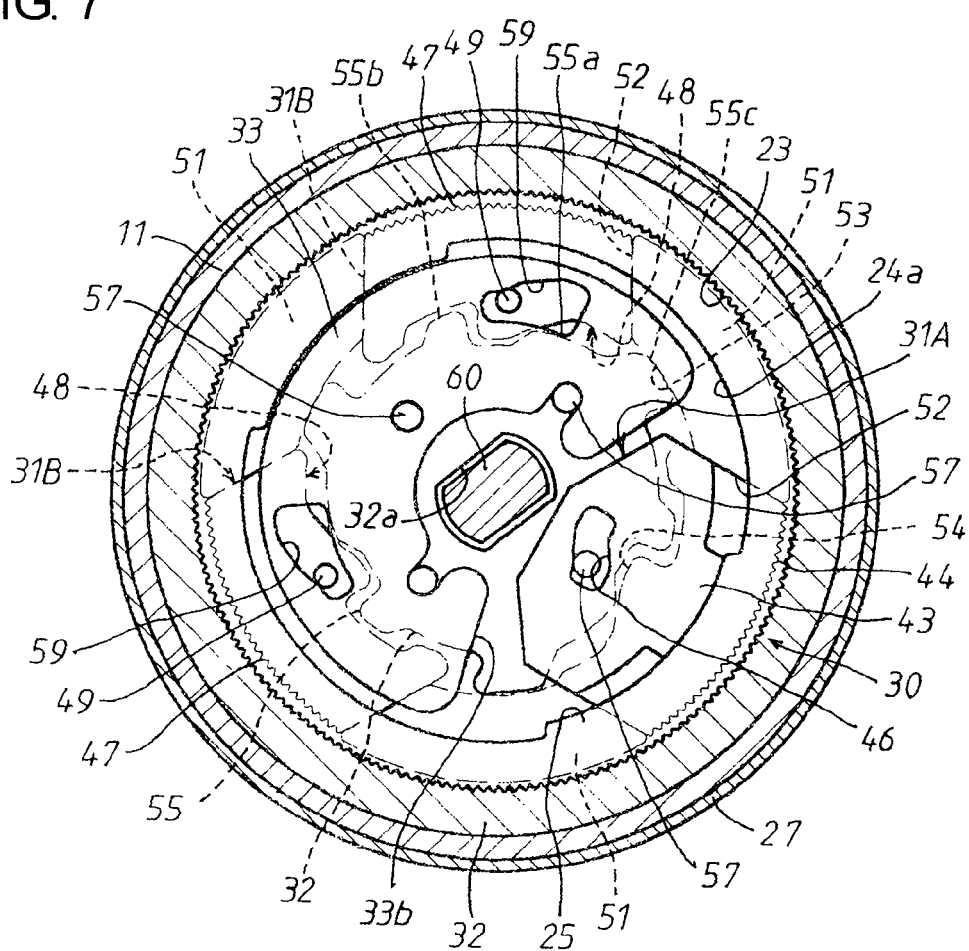
[FIG. 7] is another operational state view of FIG. 2, showing the seat reclining apparatus in a free state.

Further, when in the state of the locking released, the seatback (the seatback frame 14) is rotated forward relative to the seat cushion (the seat cushion frame 13) beyond a predetermined angle, that is, into a so-called "forward folding angular range", the protrusion 25 formed on the internal surface of the round recessed portion 24 of the upper arm 12 is positioned between the engaging portion 43 formed on the first pawl 31A and the inner gear 23, as shown in FIG. 7. That is, by being engaged with the protrusion 25 of the upper arm 12 at its engaging portion 43, the first pawl 31A is prevented from moving radially outward. When the operation lever 62 is released in this state, the operating force of the spiral spring 34 tends to press the first pawl 31A in the direction to engage with the inner gear 23, but the meshing does not take place because the movement of the first pawl 31A is obstructed by the engagement between the protrusion 25 of the upper arm 12 and the engaging portion 43 of the first pawl 31A. At the same time, as a result that the radial movement of the first pawl 31A is obstructed, the rotation of the cam 32 is also obstructed, and the release plate 33 does not rotate, so that the release plate grooved cam portion 59 causes the second pawls 31B to be also held at the out-of-meshing position spaced from the inner gear 23. Accordingly, within the forward folding angular range, the seatback can be rotated without being locked.

The seatback is returned backward by the operation of the operation lever 62 from the forward folded state again to a suitable position for seating, and when the operation lever 62 is released at such a position, the first and second pawls 31A, 31B, the cam 32 and the release plate 33 are returned to the stated shown in FIG. 2 to be brought into the locking state.

As described above, according to the aforementioned first embodiment, the plurality of pawls 31 on a circle are constituted by the first pawl 31A and the second pawls 31B, and the first pawl 31A is provided with the inner cam portion 45 engaged with the cam surface provided on the outer circumference of the cam 32, the pawl grooved cam portion 46 engaged with the engaging protrusion 57 provided on the cam 32 and the engaging portion 43 engaged with the protrusion 25 of the upper arm 12, while the second pawls 31B are provided with the engaging protrusions 49 engaged with the release plate grooved cam portions 59. Thus, it is possible for the cam 32 to press the paws 31 at places close to the meshing portions between the outer gears 44, 47 and the inner gear 23, and hence, it is possible to lock the upper arm 12 against the lower arm 11 reliably with a strong force. As a consequence, the support strength of the seatback can be enhanced, so that the seatback can be held steady.

In addition, since the second pawls 31B can be made to take a flat shape which is simple in comparison with the first pawl 31A and can be manufactured by pressing, the cost for manufacturing the pawls can be reduced, so that in spite of the release plate 33 added, the reduction in cost can be realized as a whole of the seat reclining apparatus.

Further, according to the first embodiment, since the pawls 31 are constituted by one first pawl 31A and the plurality of second pawls 31B, the first pawl 31A having the inner cam portion 45, the pawl grooved cam portion 46 and the engaging portion 43 suffices to be provided by one only for each seat reclining apparatus, so that the pawl manufacturing cost can effectively be reduced.

Further, according to the first embodiment, the release plate 33 takes the approximately ring shape as a whole with the sector cutout 33b provided at a part thereof, and the first pawl 31A is arranged at the place of the cutout 33b to avoid an interference between the first pawl 31A and the release plate 33. Therefore, it is possible to receive the second pawls 31B and the release plate 33 in the extent covering the thickness of the first pawl 31A. It is also possible to lock and unlock the pawls 31 at the center portion in the axial direction between the lower arm 11 and the upper arm 12, so that the locking and the unlocking of the pawls 31 can be carried out steady.

Furthermore, according to the first embodiment, the three pressed portions 50a, 50b, 50c on which the cam surfaces 55 of the cam 32 act are provided at the center portions and both sides of the inner cam portions 45, 48 provided on the pawls 31, and each of the pressed portions 50a provided at the center portions of the pawls 31 and the pressed portions provided on the side ahead in the locking rotation direction of the cam 32 is constituted by a cam surface having an inclined surface which comes close to the cam surface 55 of the cam 32 with rotation of the cam 32 in the locking rotation direction, while each of the pressed portions 50c provided on the side behind in the locking rotation direction of the cam 32 is constituted by the arc surface having its center on the rotation center of the cam 32. Thus, it is possible for the pluralities of pressed portions 50a, 50b, 50c to lock the respective pawls 31 against the upper arm 12 in a stable posture, and hence, it is possible to reliably bring the outer gears 44, 47 of the respective pawls 31 into meshing engagements with the inner gear 23 of the upper arm 12.

Additionally, by centering the centering segments 55c of the cam 32 through engagements of the internal surfaces of the guide walls 51 while the pawls 31 are held unlocked, the clearances between the outer gears 44, 47 of the first and second pawls 31A, 31B and the inner gear 23 can be held to be approximately equal, so that it can be avoided that the malfunction in pivotal movement or the generation of a strange sound occurs as a result that the teeth tops of a part of the pawls 31 interfere with the teeth tops of the inner gear 23.

Next, a second embodiment according to the present invention will be described with reference to FIGS. 8, 9, 10 and 11. The difference from the foregoing first embodiment resides in that a step between recessed portions at two places provided on an upper arm 12 is utilized to make it possible to limit the relative rotation between the upper arm 12 and a lower arm 11 so that the range for the reclining operation can be limited to a predetermined range without dimensionally increasing the reclining apparatus. Components which are the same as those in the first embodiment will be designated by the same reference numerals, and description of such components will be omitted.

Figure 8:
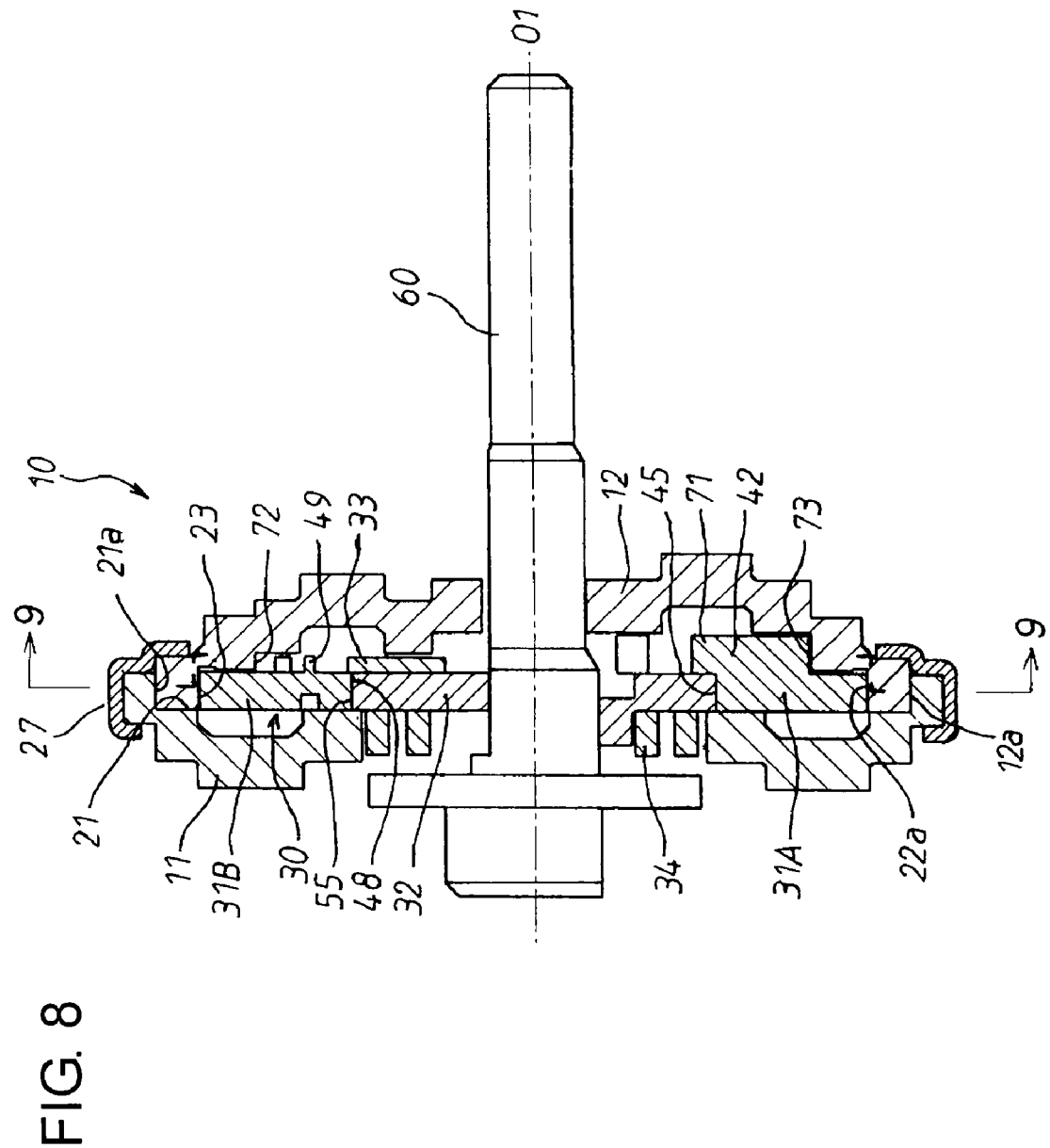
[FIG. 8] is a longitudinal sectional view of a seat reclining apparatus showing a second embodiment according to the present invention.
Figure 10:
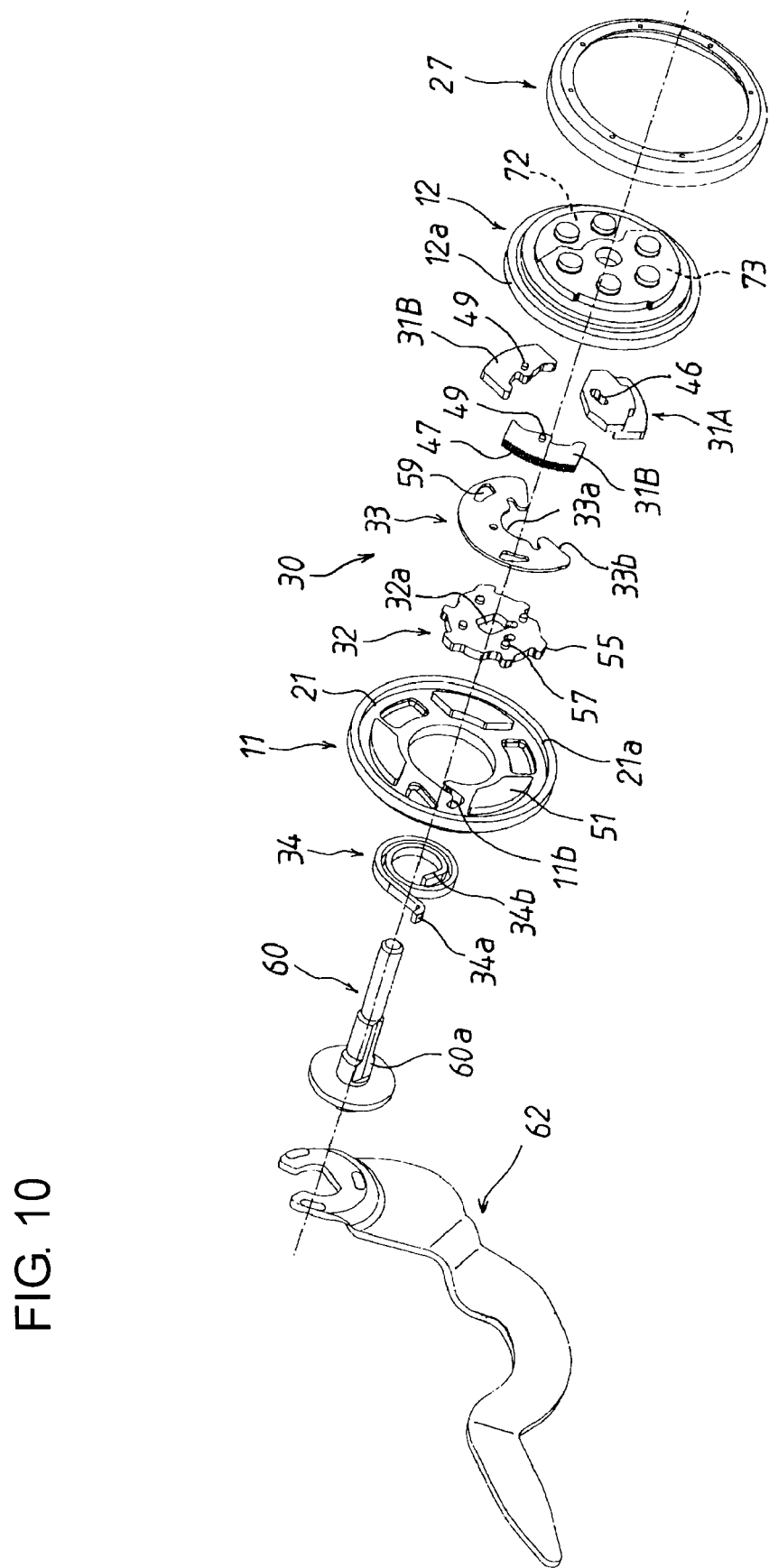
[FIG. 10] is an exploded view of the seat reclining apparatus shown in FIG. 8.

As shown in FIGS. 8 and 10, between the lower arm 11 and the upper arm 12, there is provided a locking apparatus 30 which in a similar manner as described in the first embodiment, is composed mainly of three pawls on a circle comprising first pawl 31A and second pawls 32, a cam 32, a release plate 33 and an urging member (spiral spring) 34.

In the first embodiment, the release plate 33 is attached to the cam 32 in alignment with the second block 42 of the first pawl 31A at a position in the axial direction, and the release plate 33 and the first pawl 31A are received in the round recessed portion 24 formed in the upper arm 12. On the other hand, in the second embodiment, as shown in FIG. 8, the second block 42 of the first pawl 31A is formed as a thickened portion 71 which protrudes beyond the end surface of the release plate 33, and a recessed portion 73 which receives the thickened portion 71 therein is formed in the upper arm 12.

Figure 9:
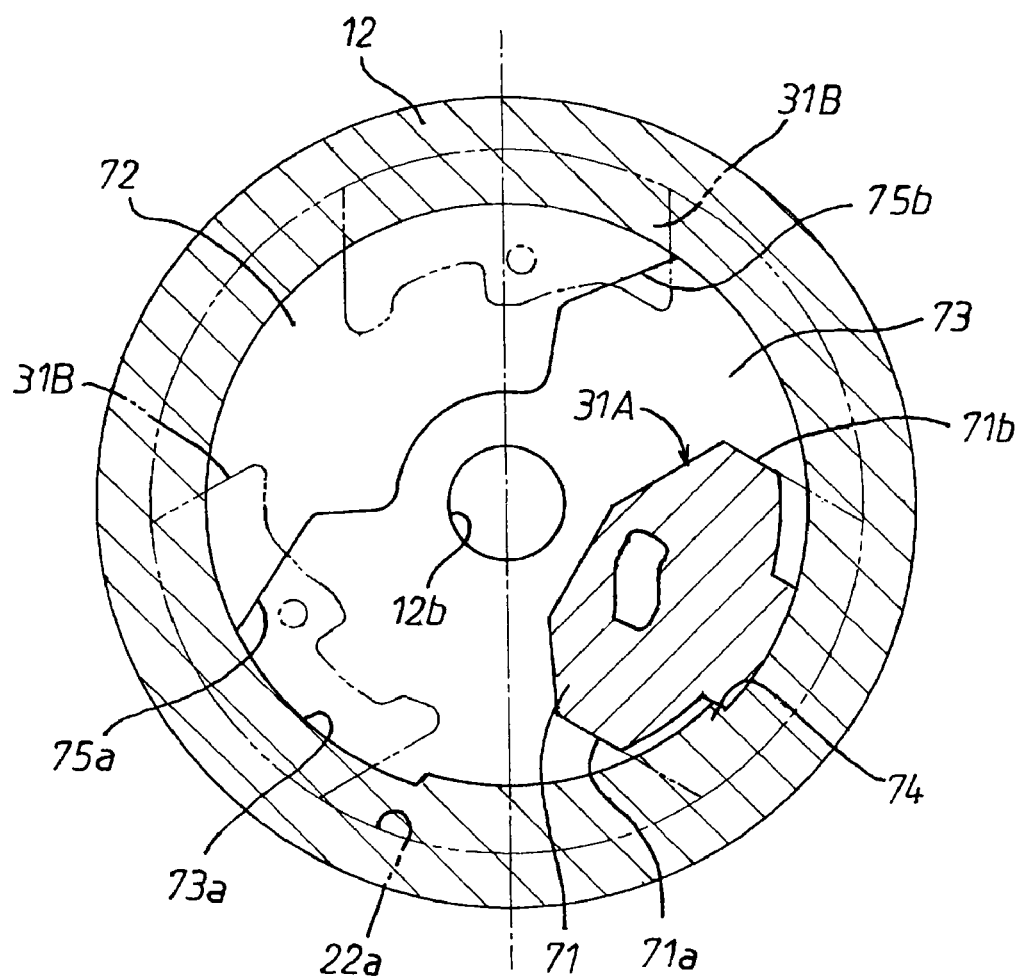
[FIG. 9] is a sectional view taken along the line 9-9 in FIG. 8.

That is, as shown in FIGS. 8 and 9, the upper arm 12 is formed by half blanking with a first recessed portion 72 (corresponding to the round recessed portion 24 in the first embodiment) capable of receiving the release plate 33 only and a second recessed portion 73 which is deeper in depth than the first recessed portion 72 and which is capable of receiving the thickened portion 71 of the first pawl 31A (refer to FIG. 10). The second recessed portion 73 is formed to a sector shape over a predetermined angular range, and the first pawl 31A is relatively rotatable within the second recessed portion 73 through a predetermined angle only. The internal surface 73a of the second recessed portion 73 is formed to be the same in diameter as an inside diameter of the first recessed portion 72, and a protrusion 74 (corresponding to the protrusion 25 in the first embodiment) is formed on the internal surface 73a toward the rotation axis O1.

By forming the second recessed portion 73 in the first recessed portion 72 by half blanking, step portions 75a, 75b are formed at two places in the circumferential direction of the boundary between the second recessed portion 73 and the first recessed portion 72, and opposite width-end portions 71a, 71b of the thickened portion 71 of the first pawl 31A received in the second recessed portion 73 are brought into contact with the step portions 75a, 75b. In this manner, it is possible to limit the relative rotation between the upper arm 12 and the lower arm 11.

Figure 11A:
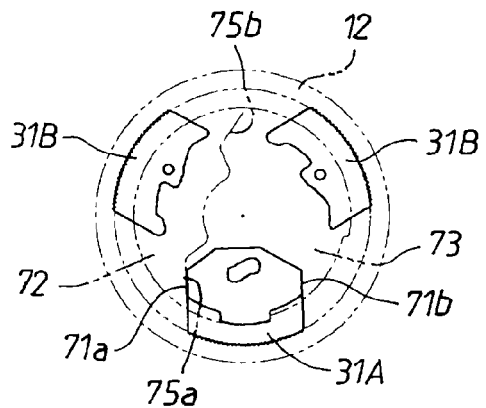
[FIGS. 11(A)-11(D)] are views showing operational states in the second embodiment.

Next, the operation of the seat reclining apparatus 10 in the second embodiment will be described with reference to FIGS. 11(A)-11(D). FIG. 11(C) shows the seat reclining apparatus 10 in the locked state, and this state is the same as the state in FIG. 2 described in the first embodiment. That is, the first and second pawls 31A, 31B are pressed by the cam 32 (refer to FIG. 8) radially outward, whereby the outer gears 44, 47 of the first and second pawls 31A, 31B and the inner gear 23 of the upper arm 12 are brought into meshing engagements to restrain the pivot movement of the upper arm 12 relative to the lower arm 11.

Figure 11B:
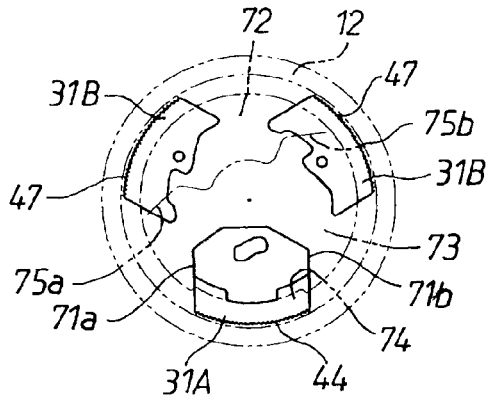
Figure 11C:
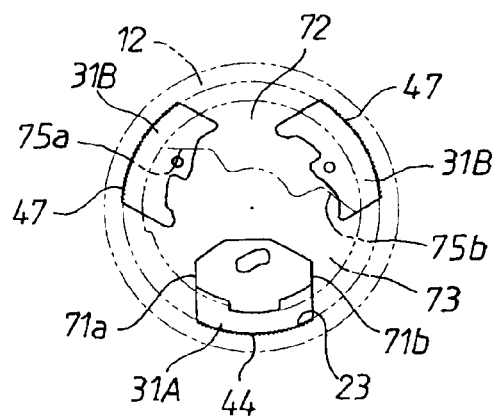

When the hinge shaft 60 (refer to FIG. 8) is rotated by the operation of the operation lever 62 in this state, the cam 32 and the release plate 33 are rotated against the urging force of the spiral spring 34, and the first pawl 31A is drawn toward the rotation axis O1 by the engaging action between the pawl grooved cam portion 46 of the first pawl 31A and the engaging protrusion 57 of the cam 32, whereby as shown in FIG. 11(B), the meshing is released between the outer gear 44 of the first pawl 31A and the inner gear 23. At the same time, the second pawl 31B are drawn toward the rotation axis O1 by the engaging actions between the engaging protrusions 49 of the second pawls 31B and the release plate groove portions 59, and the outer gears 47 of the second pawls 31B are released from meshing with the inner gear 23. That is, the unlocked state is brought about.

Therefore, it becomes possible to pivotally move the seatback to a desired angular position relative to the seat cushion. Further, when in the unlocked state, the seatback is rotated forward relative to the seat cushion beyond a predetermined angle, that is, into a so-called "forward folding angular range", the protrusion 74 formed on the internal surface 73a of the second recessed portion 73 of the upper arm 12 obstructs the radially outward movement of the first pawl 31A, so that the seatback can freely be rotated within the forward folding range without being locked (refer to FIG. 11(B)).

As the seatback is folded forward, the upper arm 12 is rotated counterclockwise in FIG. 9 relative to the lower arm 11. When the seatback is folded forward to the predetermined angular position, as shown in FIG. 11(A), one of the step portions 75a between the first recessed portion 72 and the second recessed portion 73 is brought into contact with one end surface 71a of the first pawl 31A (the thickened portion 71), whereby the pivot movement of the upper arm 12 relative to the lower arm 11 is restricted to restrict the angle of the seatback.

Figure 11D:
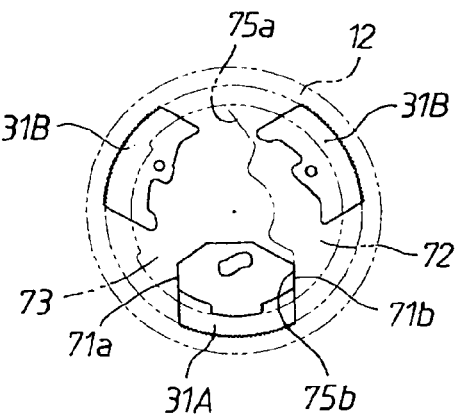

As the seatback is reclined backward on the contrary, the upper arm 12 is rotated clockwise in FIG. 9 relative to the lower arm 11. When the seatback is reclined to the predetermined angular position, as shown in FIG. 11(D), the other step portion 75b between the first recessed portion 72 and the second recessed portion 73 is brought into contact with the other end surface 71b of the first pawl 31A (the thickened portion 71), whereby the pivot movement of the upper arm 12 relative to the lower arm 11 is restricted to restrict the angle of the seatback.

According to the foregoing second embodiment, the first pawl 31A is formed with the thickened portion 71 which protrudes beyond the end surface of the release plate 33, the upper arm 12 is formed with the first recessed portion 72 for receiving the release plate 33 and the second recessed portion 73 which is deeper in depth than the first recessed portion 72 for receiving the thickened portion 71 of the first pawl 31A, and the step portions 75a, 75b at two places for limiting the range of the reclining operation to a predetermined range in contact with the thickened portion 71 of the first pawl 31A are provided at the boundary portion between the first recessed portion 72 and the second recessed portion 73. Therefore, it is possible to limit the range of the reclining operation to the predetermined range without dimensionally increasing the reclining apparatus in the radial direction. In addition, it is possible to enlarge the contact area between the thickened portion 71 of the first pawl 31A and the step portions 75a, 75b as desired without increasing the radius of the reclining apparatus, and hence, it is possible to increase the strength in contact.

In the foregoing embodiments, description has been made regarding the examples wherein the three pawls 31 are arranged on a circle, one of which is used as the first pawl 31A and the remaining two of which are used as the second pawls 31B. However, four or more pawls 31 may be arranged on a circle, wherein one or two of them may be used as the first pawls 31A and a plurality of remaining pawls may be used as the second pawls 31B.

According to the foregoing first embodiment, the plurality of pawls comprise the first pawl having the inner cam portion engaged with the cam surface provided on the outer circumference of the cam, the pawl grooved cam portion engaged with the engaging protrusion provided on the side surface of the cam, and the engaging portion brought into engagement with the protruding portion provided on the internal surface of the upper arm when the upper arm is pivotally moved the predetermined angle relative to the lower arm; and the second pawl having the inner cam portion engaged with the cam surface provided on the outer circumference of the cam and the engaging protrusion engaged with the release plate grooved cam portion provided in the release plate. Thus, it is possible for the cam to press the pawls at places close to the meshing portions between the outer gears and the inner gear, and hence, it is possible to lock the upper arm against the lower arm reliably with a strong force. As a consequence, the support strength of the seatback can be enhanced, so that the seatback can be held steady. In addition, since the second pawl can be made to take a flat shape which is simple in comparison with the first pawl and can be manufactured by pressing, the cost for manufacturing the pawls can be reduced, so that in spite of the release plate added, the cost reduction can be realized as a whole of the seat reclining apparatus.

According to the foregoing first embodiment, since the pawls comprise the first pawl being one in number and the second pawls being plural in number, the first pawl having the inner cam surface, the grooved cam portion and the engaging portion suffices to be provided by one only for each seat reclining apparatus, so that the cost for manufacturing the pawls can be reduced effectively.

According to the foregoing first embodiment, since the release plate takes the approximately ring shape as a whole with the sector cutout provided at a part thereof and since the first pawl is arranged at the place of the cutout to avoid the interference between the first pawl and the release plate, it is possible to receive the second pawls and the release plate in the extent covering the thickness of the first pawl, and it is also possible to lock and unlock the pawls at the center portion in the axial direction between the lower arm and the upper arm, so that the locking and the unlocking of the pawls can be carried out steady.

According to the foregoing first embodiment, the three pressed portions on which the cam surface of the cam acts are provided at the center portion and the both sides of the inner cam portion provided on each pawl, and each of the pressed portion provided at the center portion and the pressed portion provided on the side ahead in the locking rotation direction of the cam of each pawl is constituted by the cam surface having the inclined surface which comes close to the cam surface of the cam with rotation of the cam in the locking rotation direction, while the pressed portion provided on the side behind in the locking rotation direction of the cam is constituted by the arc surface having its center on the rotation center of the cam. Thus, it is possible for the plurality of pressed portions to press each pawl toward the upper arm in a stable posture, and hence, to reliably bring the outer gear of each pawl into meshing with the inner gear of the upper arm.

According to the foregoing second embodiment, the first pawl is formed with the thickened portion which is increased in thickness to protrude beyond the end surface of the release plate, the first recessed portion for receiving the release plate and the second recessed portion which is deeper in depth than the first recessed portion for receiving the thickened portion of the first pawl are formed in the upper arm over the predetermined angular range, and the step portions at two places for limiting the range of the reclining operation to the predetermined range in contact with the thickened portion of the first pawl are provided at the boundary portion between the first recessed portion and the second recessed portion. Therefore, it is possible to limit the range of the reclining operation to the predetermined range without dimensionally increasing the reclining apparatus in the radial direction. In addition, it is possible to enlarge the contact area between the first pawl and the step portions as desired without increasing the radius of the reclining apparatus, and hence, it is easily possible to increase the strength in contact.

Although the present invention has been described hereinbefore on the basis of the embodiments, the present invention is not limited to the constructions described in the embodiments and may take various forms within the scope of claims.

INDUSTRIAL APPLICABILITY

A seat reclining apparatus according to the present invention is suitable for use in a vehicle seat which supports a seatback to be angularly adjustable relative to a seat cushion.

DESCRIPTION OF SYMBOLS

10 . . . seat reclining apparatus, 11 . . . lower arm, 12 . . . upper arm, 13 . . . seat cushion frame, 14 . . . seatback frame, 23 . . . inner gear, 25 . . . protrusion, 30 . . . locking mechanism, 31A . . . first pawl, 31B . . . second pawl, 32 . . . cam, 33 . . . release plate, 33b . . . cutout, 34 . . . urging member (spiral spring), 43 . . . engaging portion, 44, 47 . . . outer gear, 45, 48 . . . inner cam surface, 46 . . . pawl grooved cam portion, 49 . . . engaging protrusion, 50a, 50b, 50c . . . pressed portion, 51 . . . guide wall, 53 . . . internal surface, 55 . . . cam surface, 55a, 55b, 55c . . . pressing portion, 57 . . . engaging protrusion, 59 . . . release plate grooved cam portion, 60 . . . hinge shaft, 71 . . . thickened portion, 72 . . . first recessed portion, 73 . . . second recessed portion, 75a, 75b . . . step portion

The invention claimed is:
1. A seat reclining apparatus comprising:
a lower-arm adapted to be supported on a seat cushion;
an upper arm supported by the lower arm to be relatively pivotable and adapted to be supported on a seatback;
a plurality of pawls arranged in the lower arm to be radially movable along guide walls and having outer gears disengageably engaged with an inner gear provided on an internal surface of the upper arm;
a cam for radially moving the pawls by being rotated;
a release plate attached bodily to the cam; and an urging member for urging the cam to rotate in one direction;

wherein the pawls include a first pawl having an inner cam portion engaged with a cam surface provided on an outer circumference of the cam, a pawl grooved cam portion engaged with an engaging protrusion that protrudes in an axial direction on a side surface of the cam, and an engaging portion brought into engagement with a protruding portion provided on an internal surface of the upper arm when the upper arm is pivotally moved a predetermined angle relative to the lower arm; and a second pawl having an inner cam portion engaged with the cam surface provided on the outer circumference of the cam and an engaging protrusion engaged with a release plate grooved cam portion provided in the release plate.

2. The seat reclining apparatus as set forth in claim 1, wherein the second pawl includes a plurality of second pawls.

3. The seat reclining apparatus as set forth in claim 2, wherein the release plate takes an approximately ring shape as a whole with a sector cutout provided at a part thereof and wherein the first pawl is arranged at the place of the cutout to avoid an interference between the first pawl and the release plate.

4. The seat reclining apparatus as set forth in claim 1, wherein three pressed portions on which the cam surface of the cam acts are provided at a center portion and both sides of the inner cam portion provided on each pawl, and wherein each of the pressed portion provided at the center portion and the pressed portion provided on a side ahead in a locking rotation direction of the cam of each pawl is constituted by a cam surface having an inclined surface which comes close to the cam surface of the cam with rotation of the cam in the locking rotation direction, while the pressed portion provided on a side behind in the locking rotation direction of the cam is constituted by an arc surface having its center on a rotation center of the cam.

5. The seat reclining apparatus as set forth in claim 1, wherein the first pawl is formed with a thickened portion which is increased in thickness to protrude beyond an end surface of the release plate, wherein a first recessed portion for receiving the release plate and a second recessed portion which is deeper in depth than the first recessed portion for receiving the thickened portion of the first pawl are formed in the upper arm over a predetermined angular range, and wherein step portions at two places for limiting the range of a reclining operation to a predetermined range in contact with the thickened portion of the first pawl are provided at a boundary portion between the first recessed portion and the second recessed portion.

* * * * *